United States Patent [19]
Cullen

[11] Patent Number: 6,084,923
[45] Date of Patent: Jul. 4, 2000

[54] SYSTEM, APPARATUS AND METHOD FOR AVERAGING DIGITIZED PHASE SAMPLES

[75] Inventor: David Cullen, San Jose, Calif.

[73] Assignee: Ericsson Inc, Research Triangle Park, N.C.

[21] Appl. No.: 09/001,621

[22] Filed: Dec. 31, 1997

[51] Int. Cl.[7] .............................. H03D 3/22; H03D 3/02; H03L 7/00
[52] U.S. Cl. .............................. 375/329; 329/336; 331/25
[58] Field of Search .................................. 375/329, 334, 375/308; 324/26.82, 83; 331/1 A, 27, 25; 329/336, 345

[56] References Cited

U.S. PATENT DOCUMENTS

| | | | |
|---|---|---|---|
| 4,920,278 | 4/1990 | Nawata | 307/262 |
| 5,084,669 | 1/1992 | Dent | 324/83 D |
| 5,220,275 | 6/1993 | Holmqvist | 324/76.82 |

*Primary Examiner*—Chi H. Pham
*Assistant Examiner*—Khai Tran
*Attorney, Agent, or Firm*—Jenkens & Gilchrist

[57] ABSTRACT

The present invention is directed to a system, apparatus and method for averaging digitized phase values. In particular, the polar coordinates represented by the digitized phase values are converted to rectangular coordinates via trigonometric identities. Several coordinate values are averaged, and the quadrant information derived from the signs (+ or −) of the averaged values is used to efficiently convert the final averaged rectangular coordinates back to polar representation.

16 Claims, 4 Drawing Sheets

SYSTEM, APPARATUS AND METHOD FOR AVERAGING DIGITIZED PHASE SAMPLES

BACKGROUND AND OBJECTS OF THE PRESENT INVENTION

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

One advance in the telecommunications arts is the use of phase digitization, i.e., measuring the phase of a signal and reporting the result as a number. Phase digitization is similar to analog-to-digital conversion, where the amplitude of a signal is measured and the result reported as a digital number. Although originally conceived in military and satellite communications, phase digitizers are currently used in all types of telecommunications, e.g., in land mobile radio (LMR). In the United States, cellular channels are spaced 30 KHz apart, permitting large deviation modulating schemes. In the land mobile radio spectrum, channel spacing is 25 KHz in the 800 MHZ range and 12.5 KHz in other ranges, e.g., 400 MHZ, 900 MHZ, etc. As is understood in the art, phase digitizers operate best in wide band operation, and their performance degrades as the channel deviation decreases. Since the Federal Communications Commission (FCC) plans to migrate spectrum usage to even narrower spacing in the near future, phase digitizer performance degradation due to reduced deviation will become an increasing concern and may seriously compromise system performance.

As is understood in the art, the performance problem in narrow band phase digitizer operation is the result of an inherent flaw that arises from the slightly non-periodic sampling of the phase digitizer. In other words, phase digitization of signals results in unpredictable signal artifacts. For example, when a phase digitizer is used as a demodulator in FM systems, demodulation of a pure tone causes extra tones to appear. Energy from the original signal is converted to the extra tones by the non-periodic sampling of the phase digitizer. The net result is that the measured hum and noise of an FM system employing a phase digitizer is worse than an FM system using an analog discriminator. Similarly, when a phase digitizer is used in phase modulation schemes, phase error increases, resulting in higher bit error rates.

One proposed solution addressing the quantization and sampling problems is averaging the phase samples, which would improve the performance of phase digitizing systems. One such solution is set forth in U.S. Pat. No. 5,220,275 to Bo P. Holmqvist. Another is to error compensate by interpolation, as described in U.S. patent application Ser. No. 08/982,202, entitled "Phase Digitizer for Radio Communications", also to Mr. Holmqvist.

It is, however, difficult to efficiently average phase and interpolate, primarily due to the non-linear wrapping of phase around the zero degree point.

What is needed, therefore, is an efficient way to average digitized phase samples that ameliorates or eliminates the aforementioned inherent flaws.

It is, accordingly, an object of the present invention to improve the efficiency of averaging phase digitizer samples.

It is also an object of the present invention to employ an improved system and method that overcomes or reduces the deleterious effects caused by the inherent flaws encountered in phase digitization.

SUMMARY OF THE INVENTION

The present invention is directed to a system, apparatus and method for averaging digitized phase values. In particular, the polar coordinates represented by the digitized phase values are converted to rectangular coordinates via trigonometric identities. Several coordinate values are averaged, and the quadrant information derived from the signs (+ or -) of the averaged values is used to efficiently convert the final averaged rectangular coordinates back to polar representation.

BRIEF DESCRIPTION OF THE DRAWINGS

A more complete understanding of the system, method and apparatus of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As discussed hereinbefore, the present invention is directed to systems and methods for efficiently averaging digitized phase values. One important mathematical principle relied upon is that the magnitude of a sinusoidal signal is constant. For convenience, this constant can be assumed to be 1. Let the original sinusoid be represented as follows:

$$A \cos(\omega t + \phi)$$

where A is the amplitude (which, as discussed, is assumed to be 1), $\omega$ is the frequency of the sinusoid (i.e., the carrier frequency), and $\phi$ is the phase (the quantity to be measured). This sinusoid can be represented in complex notation as follows:

$$A^{j\phi} = A(\cos(\omega t + \phi) + j \sin(\omega t + \phi))$$

In polar coordinates, this would be written as (A, φ) Further, since A is assumed for convenience to be 1, the coordinates can be written as (1, φ). This point can then be converted to rectangular coordinates using the following trigonometric identities:

$$x = \cos(\phi)$$

and $$y = \sin(\phi)$$

Several values of x and y, i.e., ($x_1$, $x_2$, $x_3$, ..., $x_N$; and $y_1$, $y_2$, $y_3$, ..., $y_N$), are calculated and averaged, resulting in $x_{avg}$ and $y_{avg}$. As is understood in the mathematical and computational arts, averaging phase values in polar coordinate notation is complicated and computationally expensive. Averaging rectangular coordinates, on the other hand, is simple and computationally inexpensive (just add the numbers and divide by N). If a sine lookup table is used, the whole process therefore becomes computationally inexpensive. Normally, conversion back to phase would require an expensive divide and an inverse tan ($\tan^{-1}$) computation. However, because the amplitude is constant, the average amplitude is constant, for example:

$$\frac{A + A + A}{3} = A$$

Because of this fact, the less expensive inverse cosine ($\cos^{-1}$) or inverse sine ($\sin^{-1}$) calculation may be used. However, $x_{avg}$ will be in the range [−1, 1], so $\cos^{-1}(x_{avg})$ will be in the range [0, π]. To get the full [−π, π] range, however, the signs (+ or −) of the $x_{avg}$ and $y_{avg}$ values is used to recover the quadrant of the phase. If a lookup table is used to implement the $\cos^{-1}(x_{avg})$, then the computation becomes very inexpensive. The cost of the quadrant recovery is negligible, as will be discussed in more detail hereinafter.

Figure 1:
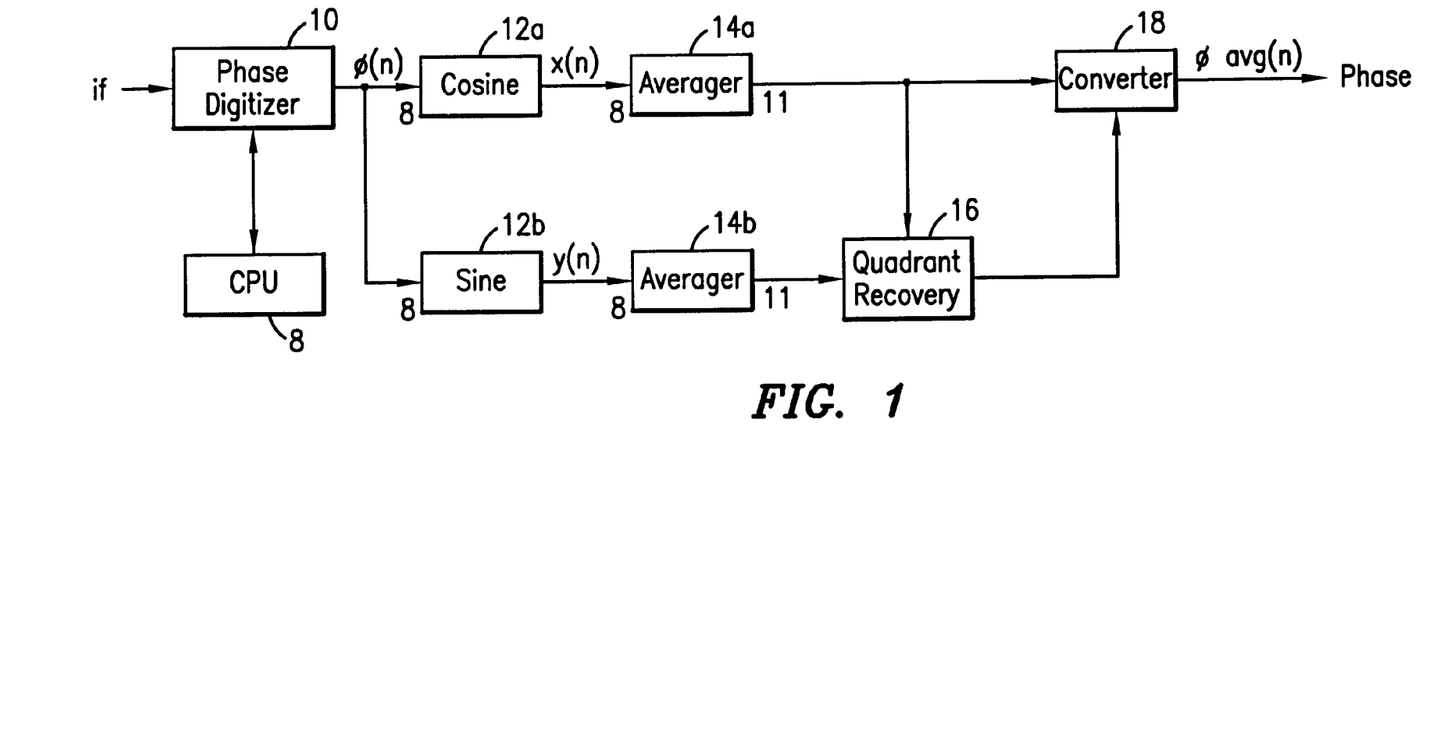
FIG. 1 is a schematic diagram of a phase digitizer and digital phase averager in accordance with the present invention.

With reference now to FIG. 1, there is illustrated a schematic flowchart diagram for practicing the present invention according to a presently preferred embodiment. As discussed hereinbefore, phase digitizer performance is compromised by the very nature of the errors and sampling techniques employed. Current phase averaging approaches, although offering the possibility of improving performance, are difficult to implement due to the non-linearity and unpredictableness of the estimations. The approach utilized in the present invention, as exemplified in FIG. 1 et seq., however, ameliorates or overcomes these disadvantages by averaging the phase samples in rectilinear coordinates instead of polar coordinates.

A phase digitizer 10, such as that described in U.S. Pat. No. 5,220,275, receives the Intermediate Frequency (IF) signal, measures the phase of the signal, and reports a digital number as the result, e.g., an 8-bit twos-complement value representing the phase of the IF signal. The 8-bit values of the phase signal map the continuous range [−π, π] to the discrete range [−128, 127], as is understood in the art.

It should be understood that the IF may be at any frequency, e.g., 400 KHz for LMR usages and even 10 MHZ for cordless phones. It should also be understood that the number of digital bits (also referred to as word length) used in the phase quantization or estimation may also vary depending upon the relative frequencies of the IF and the clock used by the phase digitizer.

In the diagram shown in FIG. 1, for example, 8 bits are used in the digital approximation by the phase digitizer 10 of the phase, as shown in the notation on the adjacent output lines. As is understood in the binary notation art, in 2s-complement notation the leftmost bit or most significant bit (MSB) is the sign bit. The value of an 8-bit 2s-complement number is calculated by the formula:

$$\text{value} = ((\text{sign-bit}) \times -128) + (\text{7-bit value})$$

where a sign-bit of zero represents a positive value and a sign-bit of one represents a negative value. For example, the binary number 00100000 represents the decimal value 32, as shown below:

$$\text{value} = (0 \times -128) + 32$$
$$= 32$$

and the binary number 10100000 represents the decimal value −96, as shown below:

$$\text{value} = (1 \times -128) + 32$$
$$= -128 + 32$$
$$= -96$$

In other words, if the binary representation of the phase is 00100000, the phase is +32 in decimal format, (π/4 in radian format or 45 degrees in degree format. Alternatively, if the binary representation of the phase is 10100000, the phase is −96 in decimal format (−3π/4 in radian format or −135 degrees in degree format).

The 8 bit phase from the phase digitizer 10, also illustrated as φ(n) in FIG. 1, is next converted into rectangular coordinates using the aforementioned trigonometric identities, i.e., x=cos(φ) and y=sin(φ).

Figure 2A:
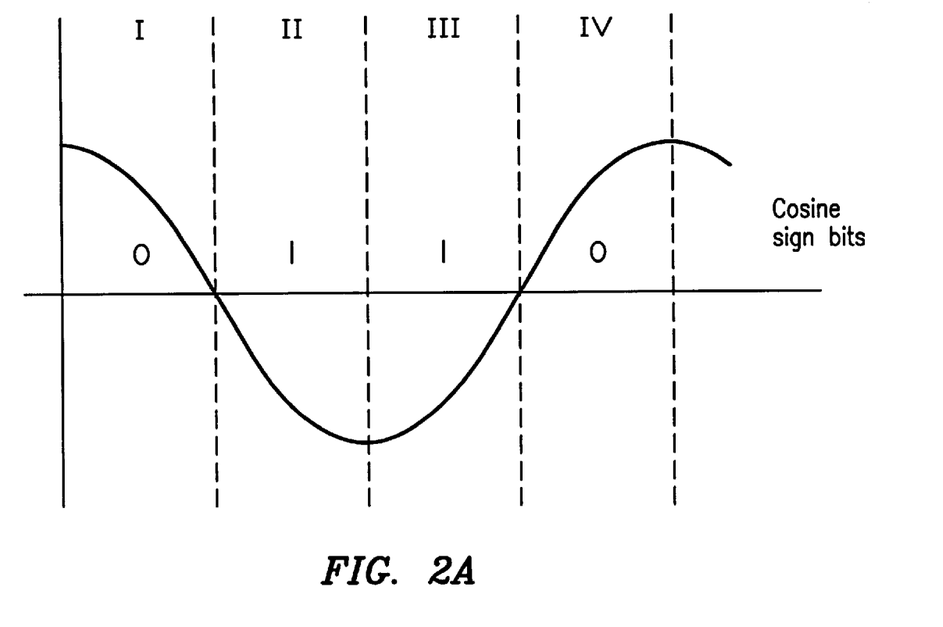
FIGS. 2A and 2B are representative diagrams of the cosine and sine values, respectively, across the four quadrants of a two-dimensional coordinate system.
Figure 2B:
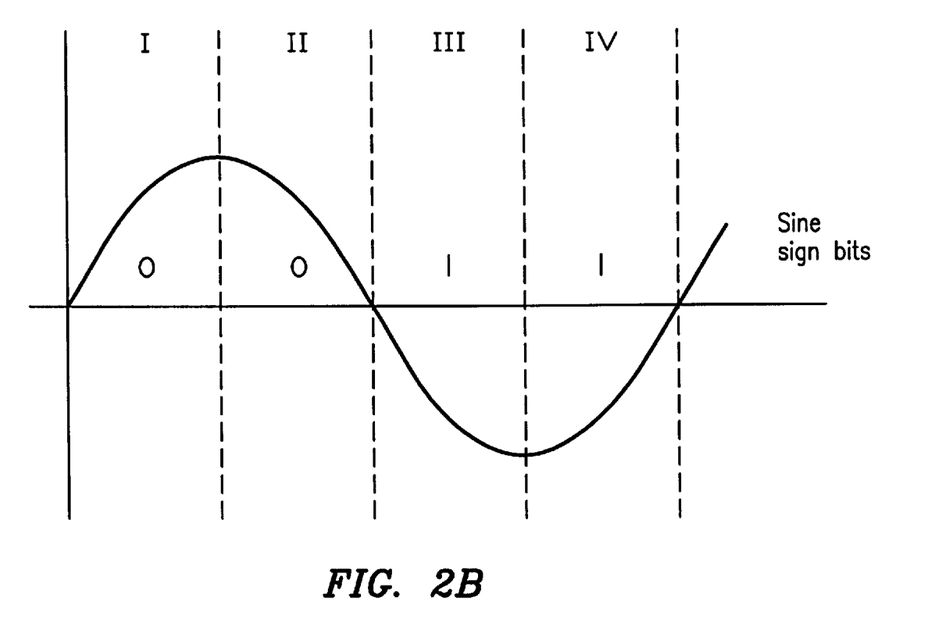
Figure 3:
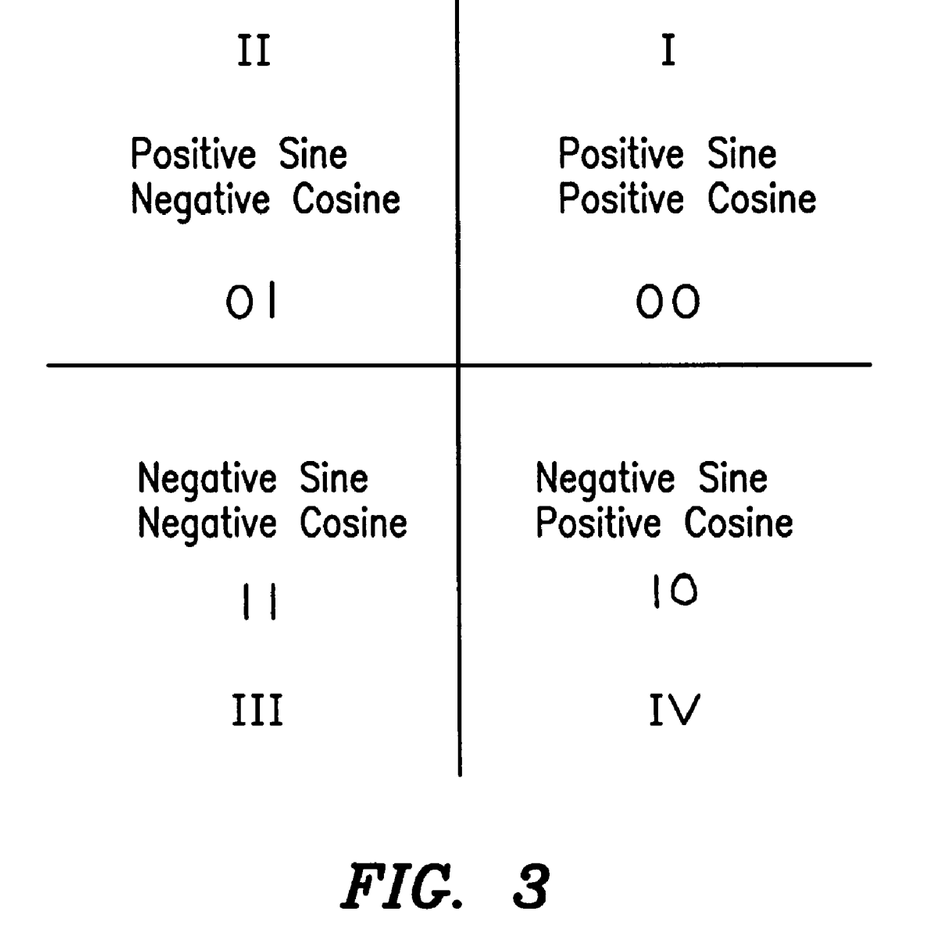
FIG. 3 is a representative diagram of the quadrants in the two-dimensional coordinate system shown in FIGS. 2A and 2B and respective quadrant values for each quadrant.

The pair of sign bits, designated herein as sc for sine and cosine, that result from the cosine 12A and sine 12B operations, respectively, indicate the quadrant of the phase angle. For example, the cosine of a phase angle in the first quadrant of a Cartesian two-dimensional coordinate system gives a sign bit of 0 and the sine of the same first quadrant phase angle gives a sign bit of 0, resulting in two-bit string or sc 00. The cosine of a phase angle in the second quadrant gives a sign bit of 1 and the sine of a phase angle in the second quadrant gives a sign bit of 0, resulting in sc=01. Likewise, the pair of sign bits for the third quadrant will be 11, and for the fourth quadrant 10. The allocation of sign bits among the four quadrants is further illustrated in FIGS. 2A, 2B and 3, where FIG. 3 represents the respective (cosine, sine) sign bits for each quadrant.

Preferably, the cosine and sine operations are performed using a trigonometric lookup table. A processor 8 may be employed to facilitate the tabular lookup function as is known in the art. Taking advantage of the mathematical relationship between the sine and cosine functions, e.g., $$\cos(x) = \sin(x + \pi/2)$$

the value of x may accordingly be manipulated to allow one lookup table to be used to calculate both results.

Taking further advantage of mathematics, e.g., the relationship:

$$\sin(x) = -\sin(x + \pi)$$

the range of values may be restricted to positive values in a sine lookup table. The table can be further shortened by virtue of the relationship:

$$\sin(x) = \sin(\pi - x) \qquad (5)$$

Accordingly, sine values for x in [0, π/2] may be used to generate all sine and cosine values needed.

The respective 8-bit cosine and sine values are preferably stored in a memory array which acts as respective averagers 14A and 14B in the preferred embodiment of the present invention. This memory array can be efficiently implemented using a first in, first out (FIFO) architecture or a circular buffer, as is understood in the art. Any number of values may be stored, although the preferred number is eight samples. It should, therefore be understood that the cosine averager 14A contains the values x(n), x (n−1), . . . x(n−(N−1)). Similarly, the sine averager 14B contains y(n), y(n−1), . . . y(n−(N−1)). In either case (FIFO or circular buffer) the values are summed in a sliding window fashion, which is well understood by those skilled in the art. This summation is actually an average without the usual divide by N. If the memory array is initialized to all zeroes, this sliding window summation may be implemented inexpensively by using the following formula:

$$\text{average}(n) = \text{average}(n-1) + x(n) - x(n-N)$$

As is apparent, the above formula avoids any expensive divisions. If a FIFO is used, this formula can be implemented by subtracting the oldest sample in the memory array from the stored average and then adding the current sample to the stored average. Summing the N values of the x's and y's is performed as follows:

$$x_{avg}(n) = \sum_{i=0}^{N-1} x(n-i)$$

and $$y_{avg}(n) = \sum_{i=0}^{N-1} y(n-i)$$

If eight 8-bit 2s-complement values are summed, the range of results of the summation may be represented by an 11-bit 2s-complement value, as is understood in the art. Once again, the MSB of the 11-bit 2s-complement value is the sign bit. The entire 11-bit 2s-complement value from the summation of the cosine values, i.e., cosine averager 14A, is used with the sign bit of the summation of the sine values, calculated in a quadrant recovery device 16 from the values in the sine averager 14B, to convert the results from rectangular coordinates back to polar representation. The aforedescribed conversion to polar representation is performed by a converter 18, shown in FIGS. 1 and 4.

Figure 4:
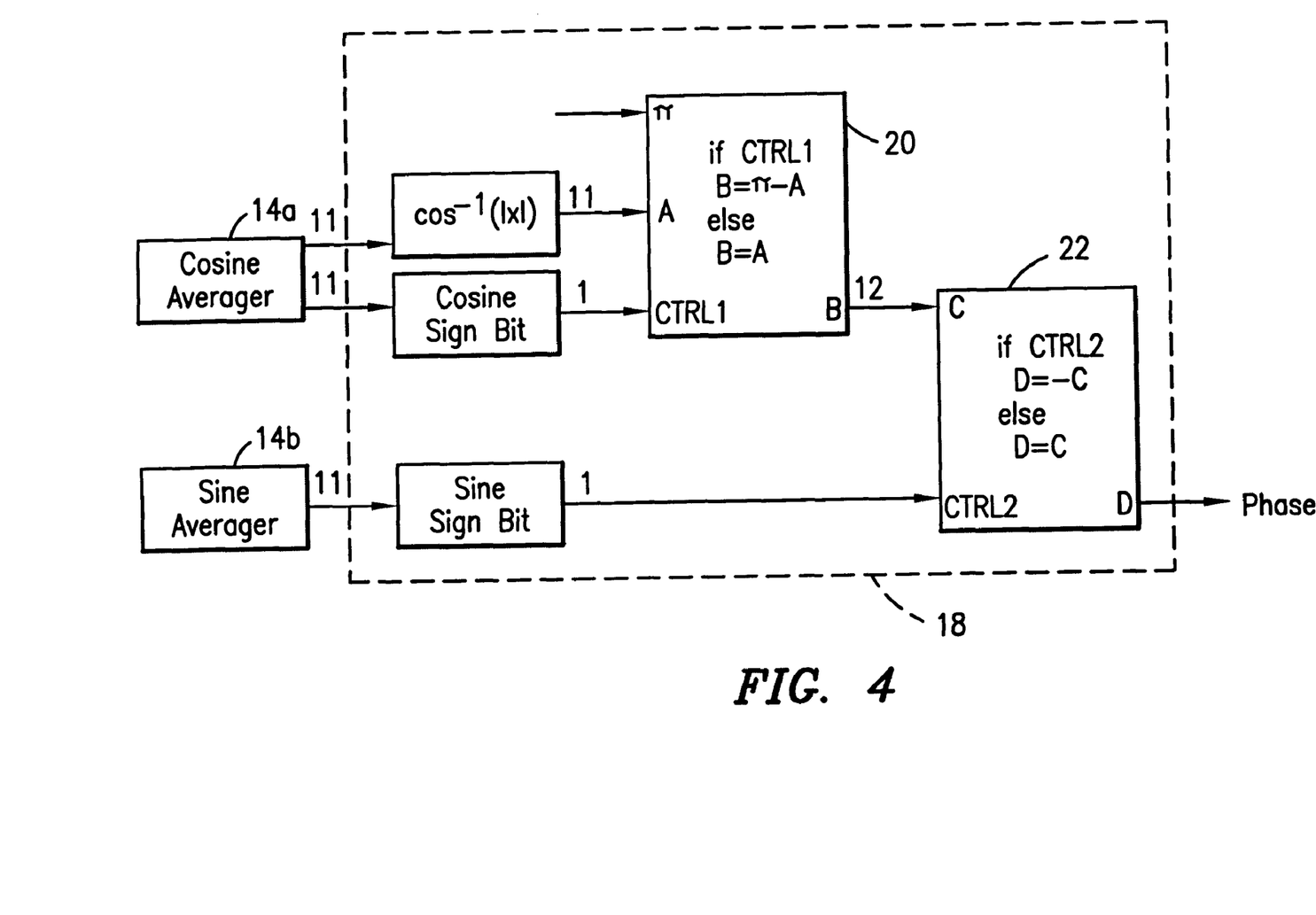
FIG. 4 is a detailed schematic diagram of the logic within the converter portion of FIG. 1.

In general, the conversion from rectangular coordinates to polar coordinates by a conventional converter 18 requires an expensive divide and an expensive $\tan^{-1}$ calculation since the phase angle (φ) is typically calculated by the following $$\phi(x,y) = \tan^{-1}(x/y) \qquad (1)$$

where x and y are the rectangular coordinates. Instead of formula (1), however, the system and method of the present invention uses the following formula:

$$\emptyset(x) = \begin{cases} \cos^{-1}(|x|), sc = 00 \\ \pi - \cos^{-1}(|x|), sc = 01 \\ \pi + \cos^{-1}(|x|), sc = 11 \\ -\cos^{-1}(|x|), sc = 10 \end{cases} \qquad (2)$$

where sc represents the aforementioned sign bits from the averaged cosine and sine values. The sign bit from the averaged cosine values is the right-most bit of sc and the sign bit from the averaged sine values is the left-most bit of sc. The $\cos^{-1}$ function should be implemented using a lookup table for maximum efficiency. With further reference to formula (2), it is apparent that taking the absolute value of the argument prior to calculating the inverse cosine permits halving the lookup table range.

Accordingly, examination of formula (2) shows that it can be rewritten as follows:

$$\emptyset(x) = \begin{cases} \cos^{-1}(|x|), sc = 00 \\ \pi - \cos^{-1}(|x|), sc = 01 \\ -(\pi - \cos^{-1}(|x|)), sc = 11 \\ -\cos^{-1}(|x|), sc = 10 \end{cases} \qquad (3)$$

which is more efficiently implemented in hardware, such as the circuitry configuration shown in FIG. 4.

As illustrated in FIG. 4, a first conversion device 20 receives an input of an 11-bit 2s-complement representation of the value of pi (π) mapped to a binary number. The 11-bit 2s-complement representation of π would be 01111111111. A second input (A) to the first conversion device 20 is the 11-bit 2s-complement value of $\cos^{-1}(|x_{avg}|)$ A third input (CTRL1) is the sign bit of the 11-bit 2s-complement value of $X_{avg}$, described hereinbefore.

With further reference to FIG. 4, the logic within the first conversion device 20 is illustrated. In particular, if the sign bit (CTRL1) of $x_{avg}$ is set (logical one), the first conversion device 20 outputs the value (B) of π−A, where A is the inputted value $\cos^{-1}(x_{avg})$; otherwise the device 20 outputs A alone. It should be understood that the value of B is a 12-bit 2s-complement number to handle the full range of values that might result from the difference of two 11-bit 2s-complement numbers.

A second conversion device 22 receives the difference value B from the first conversion device 20, represented within device 22 by the reference identifier c. A second input to the device 22 is the sign bit of the 11-bit 2s-complement value $y_{avg}$, represented by the reference identifier CTRL2. In particular, if the sign bit (CTRL2) is set (logical one), the second conversion device 22 outputs (D) the 12-bit 2s-complement value of C times minus one (−1), the product of which represents the desired phase angle; otherwise, C alone.

As an example of the operation of the aforedescribed conversion device 18, shown in FIGS. 1 and 4, assume the following phase values from the phase digitizer 10 shown in Tables 1 and 2 below, where N=8:

TABLE 1

| Sample Number | Binary Phase | Decimal Phase | Degree Phase | Cosine Value | Sine Value |
|---|---|---|---|---|---|
| 1 | 11100000 | −32 | −45 | 01011010 | 10100110 |
| 2 | 00100000 | 32 | 45 | 01011010 | 01011010 |
| 3 | 00100000 | 64 | 90 | 00000000 | 01111111 |
| 4 | 01000000 | 64 | 90 | 00000000 | 01111111 |
| 5 | 01000000 | 64 | 90 | 00000000 | 01111111 |
| 6 | 01000000 | 64 | 90 | 00000000 | 01111111 |
| 7 | 01000000 | 0 | 0 | 01111111 | 00000000 |
| 8 | 01000000 | 0 | 0 | 01111111 | 00000000 |

TABLE 2

| | Cosine Value (binary) | Cosine Value (decimal) | Sine Value (binary) | Sine Value (decimal) |
|---|---|---|---|---|
| Sum | 00110110010 | 434 | 00111111100 | 508 |

Using the summed values in Table 2, the resultant phase may be computed as follows:

$$\frac{\cos^{-1}\left(\frac{434}{128 \times N}\right)}{\pi} \times 128 = 46$$

Using the direct values in Table 1, the resultant phase may also be computed in the following manner:

$$\cos(-45) + \cos(45) + 4\cos(90) + 2\cos(0) = 3.4142;$$

and $$\frac{\cos^{-1}\left(\frac{3.4142}{N}\right)}{\pi} \times 128 = 46$$

It should be understood that the above logic and circuit configuration offers improved performance over current phase digitization systems and methods, such as those described by Holmqvist in the aforementioned patent and application. The particular averaging technique described herein has been found to ameliorate annoying hum and noise problems present in the conventional systems. As discussed, by virtue of the improved logic embedded within a circuit or facilitated by software, the system, apparatus and method of the present invention, by eliminating costly divisionoperations and arctangent lookup tables, offers even further advantages over the art.

It should also be understood that it is not required that the above invention be implemented in hardware. The parts of the invention after the phase digitizer 10, may be implemented entirely in a processor as a software algorithm.

The previous description is of a preferred embodiment for implementing the invention, and the scope of the invention should not necessarily be limited by this description. The scope of the present invention is instead defined by the following claims.

What is claimed is:

1. A phase digitizer for digitizing a received phase signal, said phase digitizer comprising:

signal conversion means for converting said received phase signal into a plurality of sequential digital phase components;

coordinate conversion means, attached to said signal conversion means, for converting each said digital phase component into a plurality of rectangular coordinate components corresponding thereto;

averaging means, attached to said coordinate conversion means, for averaging a multiplicity of sequential rectangular coordinate components; and digital conversion means, attached to said averaging means, for receiving combined averaged rectangular coordinate components from said averaging means and converting said combined averaged rectangular coordinate components into polar coordinate components which represent a respective digitized phase signal corresponding to said received phase signal.

2. The phase digitizer according to claim 1, wherein said digital conversion means further receiving a second input value equal to a representation of a sign value of said averaged rectangular coordinates components, wherein said sign indicates a quadrant of a phase angle of said phase signal.

3. The phase digitizer according to claim 1, wherein said digital conversion means further receiving a third input value equal to $\pi$.

4. The phase digitizer according to claim 1 further including a quadrant recovery device attached to said averaging means for determining a sign value of said averaged rectangular coordinates components, wherein said sign value is used by said digital conversion means to determine said polar coordinate components.

5. The phase digitizer according to claim 1, wherein said averaging means includes a first-in, first-out architecture which subtracts the earliest of said multiplicity of sequential rectangular coordinate components from said averaged rectangular coordinate components and subsequently adding a current rectangular coordinate component.

6. The phase digitizer according to claim 1, wherein said digital conversion means uses the following formula to calculate a phase angle of said respective digitized phase signal;

$$\varphi(x) = \begin{cases} \cos^{-1}(|x|), & sc = 00 \\ \pi - \cos^{-1}(|x|), & sc = 01 \\ -(\pi - \cos^{-1}(|x|)), & sc = 11 \\ -\cos^{-1}(|x|), & sc = 10 \end{cases}$$

wherein x represents a rectangular coordinate component and sc is a binary representation of said sign of said averaged rectangular coordinate components.

7. A telecommunications system for digitizing a received phase signal, said telecommunications system comprising:

reception means for receiving said phase signal;

signal conversion means, attached to said reception means, for converting said received phase signal into a plurality of sequential digital phase components;

coordinate conversion means, attached to said signal conversion means, for converting each said digital phase component into a plurality of rectangular coordinate components corresponding thereto;

averaging means, attached to said coordinate conversion means, for averaging a multiplicity of sequential rectangular coordinate components; and digital conversion means, attached to said means, for receiving combined averaged rectangular coordinate components from said averaging means and converting said combined average rectangular coordinate component into polar coordinate components which represent a respective digitized phase signal corresponding to said received phase signal.

8. The system according to claim 7, wherein said digital conversion means further receiving a second input value equal to a representation of a sign of said combined averaged rectangular coordinates components, wherein said sign indicates a quadrant of a phase angle of said phase signal.

9. The system according to claim 7, wherein said digital conversion means further receiving a third input value equal to π.

10. The phase digitizer according to claim 7 further including a quadrant recovery device attached to said averaging means for determining a sign value of said averaged rectangular coordinates components, wherein said sign value is used by said digital conversion means to determine said polar coordinate components.

11. The phase digitizer according to claim 7, wherein said averaging means includes a first-in, first-out architecture which subtracts the earliest of said multiplicity of sequential rectangular coordinate components from said averaged rectangular coordinate components and subsequently adding a current rectangular coordinate component.

12. The phase digitizer according to claim 7, wherein said digital conversion means uses the following formula to calculate a phase angle of said respective digitized phase signal;

$$\varphi(x) = \begin{cases} \cos^{-1}(|x|), sc = 00 \\ \pi - \cos^{-1}(|x|), sc = 01 \\ -(\pi - \cos^{-1}(|x|)), sc = 11 \\ -\cos^{-1}(|x|), sc = 10 \end{cases}$$

wherein x represents a rectangular coordinate component and sc is a binary representation of said sign of said averaged rectangular coordinate components.

13. A method for digitizing a received phase signal comprising the steps of:
converting said received phase signal into a plurality of sequential digital phase components,
converting each said digital phase component into a plurality of rectangular coordinate components corresponding thereto;
averaging said plurality of rectangular coordinate components with a multiplicity of adjacent rectangular coordinate components from said sequential digital phase components, and generating a combined averaged rectangular coordinate component; and
converting, from said combined averaged rectangular coordinate component, to polar coordinate components which represent respective digitized phase signal corresponding to said received phase signal.

14. The method for digitizing according to claim 7 further including the step of recovering a sign value of said averaged rectangular coordinates components, wherein said sign value is used by said step of converting to determine said polar coordinate components.

15. The method for digitizing according to claim 7, wherein said step of averaging includes a first-in, first-out architecture which subtracts the earliest of said multiplicity of sequential rectangular coordinate components from said averaged rectangular coordinate components and subsequently adding a current rectangular coordinate component.

16. The method for digitizing according to claim 7, wherein said step of converting uses the following formula to calculate a phase angle of said respective digitized phase signal;

$$\varphi(x) = \begin{cases} \cos^{-1}(|x|), sc = 00 \\ \pi - \cos^{-1}(|x|), sc = 01 \\ -(\pi - \cos^{-1}(|x|)), sc = 11 \\ -\cos^{-1}(|x|), sc = 10 \end{cases}$$

wherein x represents a rectangular coordinate component and sc is a binary representation of said sign of said averaged rectangular coordinate components.

* * * * *

UNITED STATES PATENT AND TRADEMARK OFFICE
CERTIFICATE OF CORRECTION

PATENT NO.    : 6,084,923
DATED         : July 4, 2000
INVENTOR(S)   : David Cullen It is certified that error appears in the above-identified patent and that said Letters Patent is hereby corrected as shown below:

Column 1,
Line 3, insert
-- BACKGROUND OF THE PRESENT INVENTION
Field of the Invention
The present invention relates generally to improvements in phase digitization, particularly to a system, apparatus and method for improved digitization of digitized phase samples, and, more particularly, to a system, method and apparatus for efficient averaging of digitized phase samples. --

Column 2,
Line 67, replace "$A^{j\varphi} = A (\cos (\omega t + \varphi) + j \sin (\omega t + \varphi ))$" with -- $Ae^{j\varphi} = A (\cos (\omega t + \varphi) + j \sin (\omega t + \varphi ))$ --

Column 7,
Lines 48-49, replace "costly divisionoperations and" with -- costly division operations and --

Signed and Sealed this

Twenty-first Day of January, 2003

JAMES E. ROGAN
*Director of the United States Patent and Trademark Office*